Sept. 12, 1939.   G. A. SEELEY   2,172,945
CABLE MANUFACTURING APPARATUS
Filed Oct. 19, 1938   3 Sheets-Sheet 1
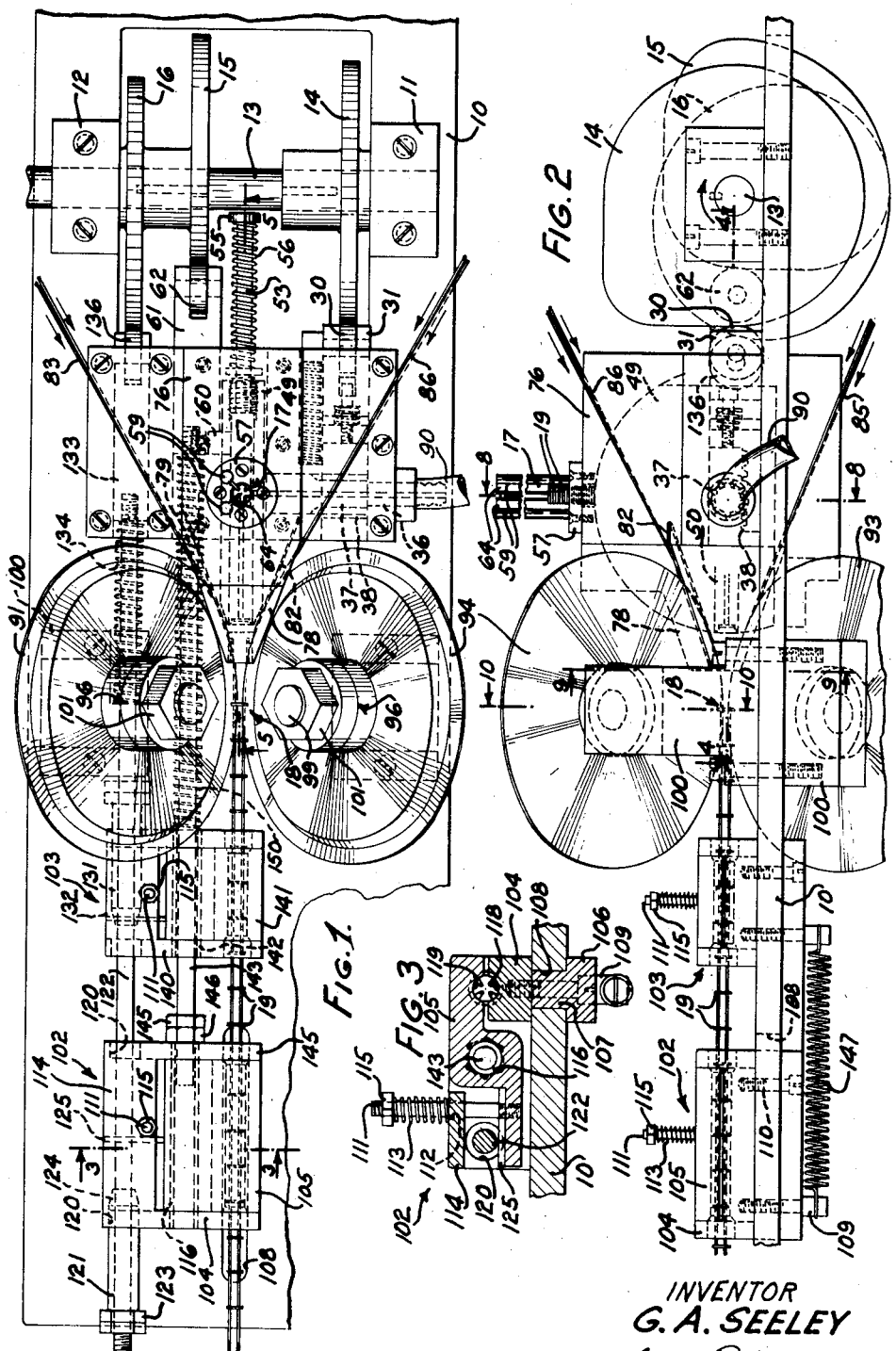
INVENTOR
*G. A. SEELEY*
BY Emery Robinson
ATTORNEY Sept. 12, 1939.  G. A. SEELEY  2,172,945
CABLE MANUFACTURING APPARATUS
Filed Oct. 19, 1938   3 Sheets-Sheet 2

INVENTOR
G. A. SEELEY
BY Emery Robinson
ATTORNEY

Sept. 12, 1939.　　　　G. A. SEELEY　　　　2,172,945
CABLE MANUFACTURING APPARATUS
Filed Oct. 19, 1938　　　3 Sheets-Sheet 3
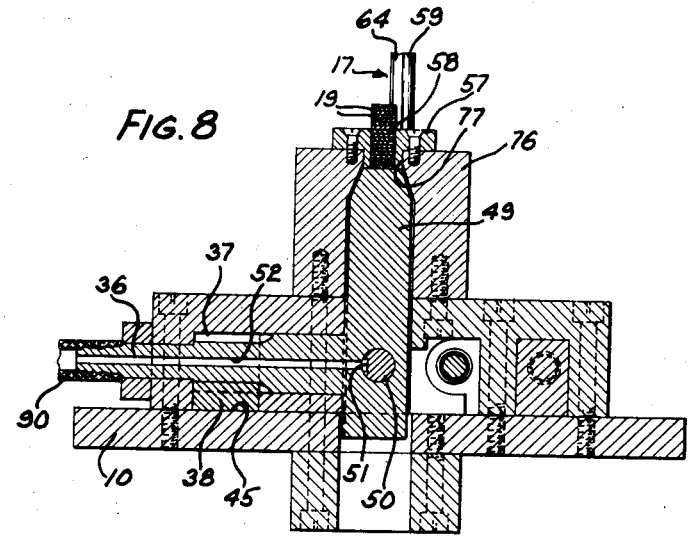
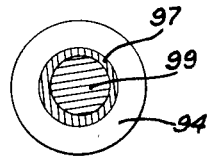
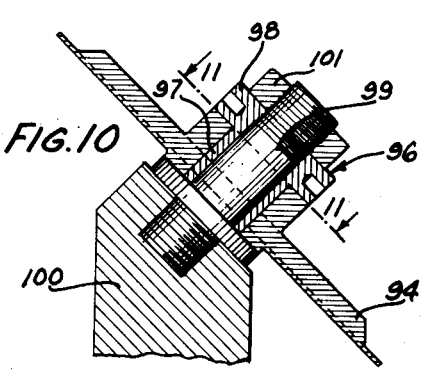
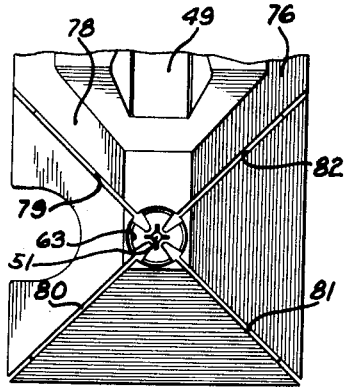
INVENTOR
G. A. SEELEY
BY Emery Robinson
ATTORNEY Patented Sept. 12, 1939

2,172,945

UNITED STATES PATENT OFFICE 2,172,945

CABLE MANUFACTURING APPARATUS

George A. Seeley, Baltimore, Md., assignor to Western Electric Company, Incorporated, New York, N. Y., a corporation of New York Application October 19, 1938, Serial No. 235,798

18 Claims. (Cl. 173—244)

This invention relates to cable manufacturing apparatus and more particularly to apparatus for assembling a group of wires on slotted washers to form a cable composed of wires spaced one from another.

It is an object of the present invention to provide a simple apparatus for quickly assembling strands and spacers to form a cable.

In accordance with one embodiment of the invention, slotted washers or spacers are fed from a magazine one at a time to an assembling position by a plunger, which carries them in an arcuate path from the magazine to the assembling position while the wires to be assembled with the spacers are stationary and which feeds them along a predetermined path through the assembling position simultaneously with the feeding of the wires. A plurality of wire-pressing members, which are adjustable radially with respect to the cable, are positioned at the assembling position for forcing the wires into the slots a predetermined distance, depending upon the position to which the pressing members are adjusted. A plurality of cams mounted upon a drive shaft control the movement of the plunger and the feeding of the cable, which is effected by means of a pair of cable gripping members, one of which is fixed and the other of which is movable. The spacing of the washers in the cable may be adjusted by changing the stroke of the cam which feeds the cable.

A better understanding of the invention, as briefly described hereinbefore, may be had by reference to the following specification, when considered in conjunction with the accompanying drawings, wherein:

Fig. 1 is a plan view of a cable assembling apparatus embodying the invention, parts being broken away to conserve space;

Fig. 2 is a side elevational view of the structure shown in Fig. 1, parts also being broken away in this figure to conserve space;

Fig. 3 is an enlarged fragmentary vertical sectional view, taken along the line 3—3 of Fig. 1 in the direction of the arrows, showing a part of the cable feeding mechanism;

Fig. 8 is an enlarged fragmentary sectional view, taken on the line 8—8 of Fig. 2 in the direction of the arrows;

Fig. 9 is an enlarged detail view of part of the apparatus adjacent the assembling position taken substantially along the line 9—9 of Fig. 2 in the direction of the arrows, the wires, spacers and wire-pressing members being omitted to more clearly illustrate the means for guiding the wires and the construction of the end of the plunger;

Fig. 10 is a fragmentary sectional view, taken substantially along the line 10—10 of Fig. 2 in the direction of the arrows, showing the mounting for the wire-pressing members; and Fig. 11 is a sectional view, taken on the line 11—11 of Fig. 10 in the direction of the arrows.

Figure 4:
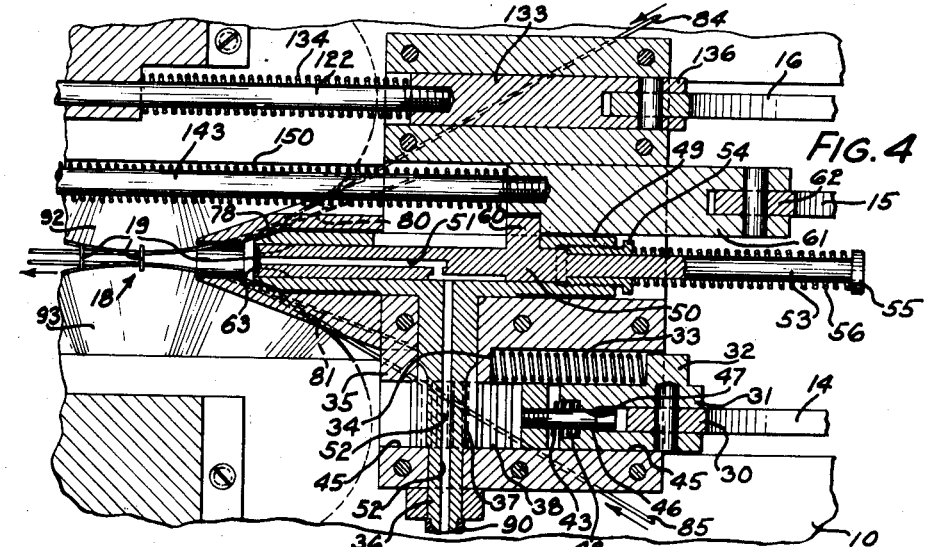
Fig. 4 is an enlarged fragmentary horizontal sectional view, taken on the line 4—4 of Fig. 2 in the direction of the arrows.

Referring to the drawings, wherein like reference characters designate the same parts throughout the several views, the numeral 10 designates the bed or base of the apparatus, which may be mounted upon suitable standards, not shown, or on a bench. Extending upwardly from the base 10 are a pair of bearings 11 and 12 for rotatably supporting a shaft 13, which may be driven in any suitable manner, for example, by means of a belt or a crank, not shown. The shaft 13 has mounted thereon three cams 14, 15 and 16 for driving the various movable parts of the apparatus. The cam 14 actuates the mechanism for transferring washers or spacers 19 from a magazine 17 to an assembling position, designated generally by the numeral 18, whereas the cam 15 serves to drive the cable in its step-by-step movement through mechanism to be described hereinafter and to move the washer or spacer 19 through the assembling position. Cam 16 serves to control the operation of the cable-feeding means, to be described hereinafter in detail.

Cooperating with the cam 14 is a cam roller 30, rotatably mounted in the right end (Figs. 1 and 4) of a drive rod 31. The drive rod 31 has a shoulder 32 formed thereon (Fig. 4) for engaging a compression spring 33, positioned between the shoulder 32 and a shoulder 34, formed on a bearing block 35. The bearing block 35 rotatably supports a hollow stud shaft 36 having gear teeth 37 formed thereon, which mesh with a rack 38.

Formed in the bearing block 35 is a guideway 45 in which the rack 38 and the drive rod 31 are slidable. Means is provided for interconnecting the rack and drive rod, which comprises a shouldered pin 46 threaded into the rack 38 and engaged in a slot 47 in the drive rod 31. A spring 48 encircling the pin 46 and seated in a depression 48 in the drive rod 31 abuts the end of the rack 38 and serves to take up the shock of the driving cam 14. It will thus be apparent that the cam roller 14 will, at predetermined times in the cycle of operation, move the rack 38 to the left (Figs. 1, 2 and 4) against the energy stored in the spring 33 and that the spring 33 will urge the rack to return into the position in which it is shown in Fig. 4.

Figure 5:
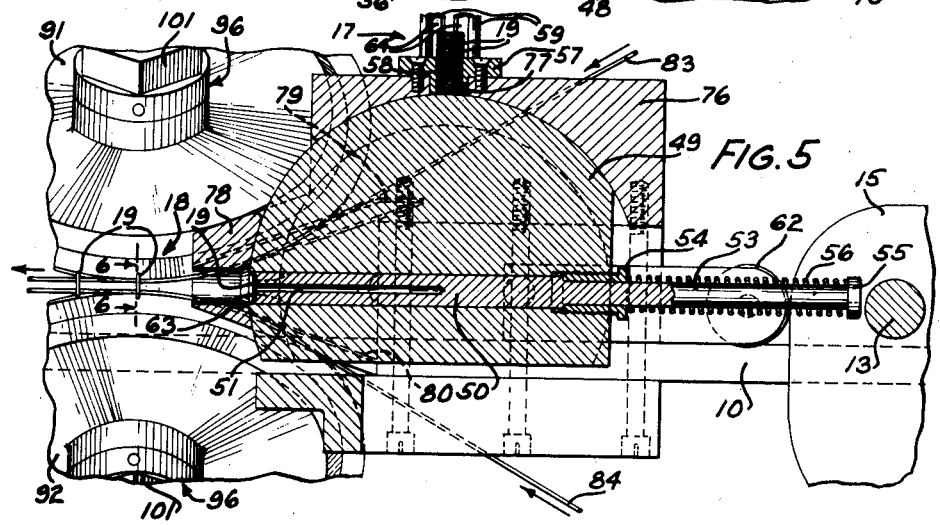
Fig. 5 is an enlarged fragmentary vertical sectional view, taken on the line 5—5 of Fig. 1 in the direction of the arrows.

The hollow shaft 36 is formed integral with a semi-circular member 49 which has a plunger 50 slidably mounted in it. The plunger 50 is provided with an irregularly shaped passage 51, normally communicating with a passage 52 in the hollow shaft, and has a reduced portion 53 slidably mounted in a collar 54 threaded into the semi-circular member 49. A coiled spring 56 encircles the reduced portion 53 of the plunger 50 and is interposed between the collar 54 and a cap 55 fixed on the end of the reduced portion 53 normally to urge the plunger 50 to the right (Figs. 1, 4 and 5).

An actuating shoulder 60 formed on the plunger 50 extends outwardly beyond the semi-circular member 49 and into the path of a push rod 61 having a cam roller 62 mounted in its right end (Fig. 4) and adapted to be driven by the cam 15 at predetermined times in the cycle of the operation of the machine. The left end (Figs. 4 and 5) of the plunger 50 has a spacer-receiving pocket 63 formed therein for carrying a spacer 19 from the magazine 17 into position to be assembled with the four wires making the cable, as will be described hereinafter From the description thus far, it will be apparent that the semi-circular member 49 will be oscillated by the rack 38 when the rack is reciprocated, movement of the rack to the left rotating the semi-circular member 49 in a clockwise direction to bring the plunger 50 into alignment with the magazine 17 and movement of the rack to the right, rotating it back to the position shown in Fig. 5.

The magazine 17 comprises a guide member 57 having a passage 58 therein through which the spacers 19 are fed to the plunger 50, and a pair of guide fingers 59 mounted on the member 57 and having fins 64 extending into the slots in the spacers 19. The fins 64 extend into the passage 58 throughout its length and accurately position the spacers in the pocket 63 in the plunger 50 so that when the plunger is rocked to the position shown in Figs. 2, 4 and 5, it will hold the spacer 19 with the slots therein in alignment with the wire to be forced into them.

The magazine 17 is mounted upon a guide block 76, which has an opening 77 formed therein in which the member 57 is seated. This guide block 76 partially encircles the member 49 and has an extending portion 78 which serves to guide the plunger 50 and which has four slots 79, 80, 81 and 82 formed therein for directing the four wires 83, 84, 85 and 86 to the assembling position 18.

The hollow shaft 36 is connected by means of a flexible hose 90 to a suitable evacuating pump (not shown) so that spacers from the magazine 17, which drop into the pocket 63, will be held thereon by suction so long as the passage 51 in the feed slide is in communication with the passage 52 in the stud shaft. Four tapered slots are formed in the left end of the plunger 50 to permit the slide to be moved forwardly or to the left (Figs. 4 and 5) into a position where the spacer carried by it will have been forced into gripping engagement with the four wires 83, 84, 85 and 86, which are fed in from suitable supplies (not shown) through the slots 79, 80, 81 and 82, respectively, formed in the guide block 76.

A group of four presser rolls 91, 92, 93 and 94 are provided for forcing the wires 83, 84, 85 and 86 into the slots in the spacers during the delivery of the spacers to the assembling station 18. These presser rolls are all of the same construction and are mounted on blocks 100 secured to the base 10, two of the rollers being mounted on the underside and two on the upper side of the base. Each of the presser rolls is mounted to rotate upon a collar 96, which comprises a sleeve portion 97 and a shoulder portion 98 eccentrically mounted on a shouldered bolt 99, which is screwed into a presser roll supporting block 100 mounted on the base 10. Figs. 10 and 11 show the method of mounting the presser roll 94 and illustrate the manner in which the other rolls are mounted, a nut 101 being provided for holding the collar 96 in position on the block 100 in any of its adjusted positions, whereby the distance which the presser roll will force its associated wire into the spacer may be determined with a high degree of accuracy.

The means for feeding the cable past the assembling station and drawing the wires into the assembling station comprises a pair of clamping devices designated generally by the numerals 102 and 103. The clamping device 102 is movable as a unit with respect to the base and comprises a main clamping plate 104 and a pivoted clamping plate 105. The plate 104 is slidable on the base 10, being clamped thereto by means of a shouldered slide plate 106, which has a portion 107 extending through a slot 108 in the base and being secured to the main clamping plate 104 by means of a pair of bolts 109 and 110. A bolt 111 threaded into the clamping plate 105 extends upwardly through a hole 112 in a horizontally extending portion 114 of the main clamping plate 104 and is normally urged upwardly by a coil spring 113 interposed between the horizontally disposed portion 114 of the clamping plate 104 and a nut 115 threaded on the upper end of the bolt 111. The spring 113 will thus urge the plate 105 to rock in a clockwise direction about a tube 116 secured in the end portions of the main clamping plate 104. The right ends (Fig. 3) of the clamping plates 104 and 105 have semi-circular cutouts formed therein at 118 and 119, respectively, for engaging a formed cable when the spring 113 is permitted to rotate the plate 105 with respect to the plate 104. The left end (Fig. 3) of the plate 104 has a pair of apertures 120 formed in the vertically extending portions thereof, as may be seen by reference to Figs. 1 and 3.

Slidably mounted in the aperture 120 at the left in Fig. 1 is an adjustable sleeve 121, which is threaded onto a push rod 122 and locked in place thereon by any suitable lock nut, such as shown at 123. The right end of the sleeve 121 is tapered, as shown at 124, to engage with a cam surface 125 formed on the clamping plate 105. It will thus be apparent that when the rod 122 is moved to the right with respect to the clamping device 102, the tapered portion 124 of the sleeve 121 will engage the cam surface 125 to rock the plate 105 counter-clockwise with respect to the plate 104, thereby to release the clamping action of the plates 104 and 105 on a cable positioned between the clamping members.

The clamping device 103 is substantially the same in construction as the clamping device 102, except that it is not slidable on the base 10, and its associated sleeve 131, which is similar to the sleeve 121, cooperates with a camming surface 132 when the rod 122 is moved to the left to effect release of the clamping device 103. The rod 122 is threaded at its right end into a cam roller supporting slide 133 and a spring 134 is interposed between the presser roll supporting block 100, which supports presser roll 91, and the slide 133, whereby the slide 133 is normally urged to the right (Figs. 1 and 4) to move a cam roller 136, rotatable therein, against its associated cam 16.

The clamping device 103 comprises a main clamping plate 140 and a pivoted clamping plate 141 and the clamping plates are pivoted with respect to one another by a sleeve 142 through which there is slidable a push rod 143, which has its right end fixed in the rod 61. Threaded on the left end of the push rod 143 are a pair of lock nuts 145 and 146, which may be adjusted on the rod 143 to determine the time at which the rod 143, in its movement, will actuate the movable clamping device 102. One end of a spring 147 is fixed to the base 10 and the other end thereof is fixed to the screw 109 for urging the clamping device 102 to the right (Figs. 1 and 2). The extreme left end of the rod 143 extends into the sleeve 116 and the rod is normally urged to the right (Fig. 1) by a spring 150, which is interposed between the fixed clamping device 103 and the rod 61, whereby the cam roller 62 is held in engagement with the cam 15.

It is believed that a better understanding of the invention may be had by the following brief description of the operation of the embodiment thereof which is disclosed herein.

Figure 7:
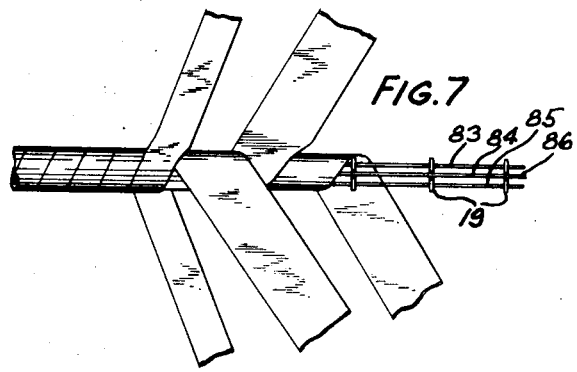
Fig. 7 is a fragmentary view of a cable of the type produced by the apparatus covered by this application.
Figure 6:
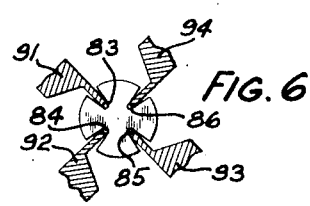
Fig. 6 is an enlarged fragmentary sectional view, taken on the line 6—6 of Fig. 5 in the direction of the arrows.

Let it be assumed that a short section of cable has been formed in any suitable manner, for example, by fitting the spacers 19 and wires together by hand and drawn through the clamping devices 102 and 103 until a portion of cable is in position, as shown in the various figures, and that a supply of spacers 19 are in the magazine 17 and one spacer is in the pocket 63 of the plunger 50. After the machine has thus been put in readiness for operation, rotation may be imparted to the shaft 13 in a clockwise direction, thereby to cause the cable to be fed and formed. As will be apparent, by reference to Fig. 2, the drive rod 31 will remain stationary for approximately three-quarters of a turn of the shaft 13. The cam 15 will move its associated cam roller 62 to the left, and in so doing, will move the clamping device 102 to the left to feed the cable through the apparatus and draw the wires 83, 84, 85 and 86 through the slots 79, 80, 81 and 82 into engagement with a spacer, which is also being fed to the left by the shoulder 60, which is in the path of the push rod 61, and will therefore push a spacer seated in the pocket 63 into engagement with the wires. Continued movement of the clamping device 102 and the plunger 50 to the left will move the spacer 19 in the pocket 63 to the center of the presser rolls 91, 92, 93 and 94. It will also be apparent, by reference to Fig. 2, that the cam 16, in the position shown, has driven the rod 122 to the left a distance sufficient to cause its tapered end to engage the camming surface 132 on the clamping plate 141, thereby to release the clamping device 103, and that the clamping device 103 will be held released for approximately one-fourth of a turn of the shaft 13. After the shaft 13 is turned approximately one-fourth of a turn from the position shown in Fig. 2, the cam 16 will permit the rod 122 to move to the right (Fig. 1) to bring the tapered portion 124 of the sleeve 121 into engagement with the camming surface 125 on the pivoted clamping plate 105 to release the clamping device 102 from the cable. After the clamping device 102 is released from the cable, and this occurs after approximately one-half turn of the shaft 13, the clamping device 102 will be moved to the right by the spring 147, and as soon as the clamping device 102 gets into the position shown, which is its normal position, its camming surface 125 will be disengaged from the tapered portion 124 from the sleeve 121 and it will again grip the cable. Just prior to the movement of the clamping device 102 to the right, the clamping device 103 will become effective to clamp the cable and prevent movement of the cable to the right. This occurs upon the withdrawal of sleeve 131 from engagement with the camming surface 132. After three-fourths of a revolution of the shaft 13, cam 14 becomes effective to reciprocate the rack 38, thereby to cause the semi-cylindrical member 30 49 to be oscillated first in a clockwise direction and then in a counter-clockwise direction to pick up a spacer 19 from the magazine 17 and deliver it to position to be advanced to the left in the next cycle of the shaft 13. It will be noted that the hose 90 applies a suction to the spacer in the pocket 63 only so long as the passage 52 in the stud shaft 36 is in communication with the passage 51 in the plunger 50 and that as soon as the spacer carried in the pocket 63 has had the wires firmly wedged in its slots, the suction will be released and continued forward movement of the plunger for a short distance will simply aid in feeding the spacer to the left, where the wires will hold it until the plunger 50 is withdrawn. After a cable has thus been formed, it may be wrapped with superposed layers of insulating material and a suitable shield applied thereon in any desirable manner to form a cable such as that shown in Fig. 7, wherein, for example, the four wires 83, 84, 85 and 86 are wedged in slots in spacers 19 and are then wrapped with layers of metallic foil and insulating material.

What is claimed is:

1. A cable-forming apparatus comprising means for feeding insulators to an assembling point, means for drawing a plurality of wires past said assembling point, and means at said assembling point for forcing the wires and insulators into intimate engagement.

2. A cable-forming apparatus comprising means for feeding insulators to an assembling point, means for drawing a plurality of wires past said assembling point, and means at said assembling point for forcing the insulators and wires into interlocking engagement.

3. A cable-forming apparatus comprising cable advancing means, spacer feeding means operable in timed relation to the operation of the cable advancing means, and means for forcing the wires into interlocking engagement with the spacers.

4. A cable-forming apparatus for forming cable composed of notched spacers and spaced strands comprising means for advancing the cable, means for feeding spacers to a predetermined position, and means for forcing the strands into intimate engagement with the spacers while they are moving.

5. A cable-forming apparatus comprising means for advancing a cable, means for feeding spacers to a predetermined position in timed relation to the advancement of the cable, and means for forcing the strands into gripping engagement with the spacers.

6. A cable-forming apparatus comprising intermittently operable cable advancing means, insulator feeding means operable in timed relation to the advancement of the cable, and means in said insulator feeding means including a plunger for wedging an insulator between the wires of the cable.

7. In a cable-forming apparatus, means for advancing the cable, a set of wedging members associated with said advancing means, means for directing strands to be formed into the cable into engagement with the wedging members, and insulator feeding means for feeding insulators into association with the wedging members.

8. In a cable-forming apparatus, means for advancing the cable, a set of wedging members associated with said advancing means, means for directing strands to be formed into the cable into engagement with the wedging members, insulator feeding means for feeding insulators into association with the wedging members, and means for adjusting said wedging members radially of the cable to determine the distance they will force the strands into the insulators.

9. In a cable-forming apparatus, a magazine for supporting a plurality of spacing insulators, oscillatable means for removing insulators from said magazine one at a time and for carrying them to a position adjacent an assembly station, means for reciprocating a portion of said oscillatable means to move an insulator into wedging engagement with a plurality of wires, a set of presser rolls for pressing the wires into intimate engagement with the insulators, and means for drawing the wires past said assembly station.

10. In a cable-forming apparatus, a cam shaft carrying a plurality of cams, a plunger adapted to be oscillated by one of said cams and reciprocated by another of said cams, a pocket formed in the end of said plunger, a magazine for supporting a plurality of spacers adjacent one position of said oscillatable plunger, a passage communicating with said magazine for directing a spacer from the magazine to the pocket in the plunger, a suction line communicating with said pocket for holding a spacer in said pocket during the oscillation of the plunger in one direction and during a part of the reciprocation of the plunger, and means associated with said plunger for forcing strands into intimate engagement with a spacer carried by the plunger.

11. In a cable-forming apparatus, clamping devices movable with respect to one another for imparting intermittent movement to a cable, and a spacer feeding plunger operable in timed relation to the operation of said clamping devices.

12. In a cable-forming apparatus, a pair of clamping devices movable with respect to one another for imparting intermittent movement to a cable, a spacer feeding plunger operable in timed relation to the operation of said clamping devices, and a set of presser rolls cooperating with the clamping devices and the plunger for forcing strands into the spacers.

13. In a cable-forming apparatus, a pair of clamping devices movable with respect to one another for imparting intermittent movement to a cable, a spacer feeding plunger operable in timed relation to the operation of said clamping devices, a set of presser rolls cooperating with the clamping devices and the plunger for forcing strands into the spacers, and means operable in timed relation to the operation of the plunger for alternately opening and closing said clamping devices.

14. An apparatus for assembling wires on multi-slotted spacers including clamping mechanisms for intermittently advancing the wires, a spacer feeding plunger for feeding spacers to the wires, and a set of adjustable presser rolls for forcing the wires into the slots in the spacers.

15. An apparatus for assembling wires on multi-slotted spacers including clamping mechanisms for intermittently advancing the wires, a spacer feeding plunger for feeding spacers to the wires in timed relation to the operation of the clamping mechanisms, and a set of adjustable presser rolls for forcing the wires into the slots in the spacers.

16. In a cable-forming apparatus, a plurality of cam actuated push rods, a spacer feeding plunger oscillated by one of said push rods and reciprocated by another of said push rods, a pair of clamping devices movable relative one to another and controlled by said push rods, a magazine for supporting a supply of spacers adjacent said plunger, a cam shaft carrying a series of cams associated with said push rods for oscillating the plunger into association with the magazine and back to the normal position and reciprocating the plunger while the clamping devices are clamping and releasing a cable and advancing it, and a series of rollers associated with the plunger for forcing the wires of the cable into the spacers.

17. In a cable-forming apparatus, a plurality of cam actuated push rods, a spacer feeding plunger oscillated by one of said push rods and reciprocated by another of said push rods, a pair of clamping devices movable relative one to another and controlled by said push rods, a magazine for supporting a supply of spacers adjacent said plunger, a cam shaft carrying a series of cams associated with said push rods for oscillating the plunger into association with the magazine and back to the normal position and reciprocating the plunger while the clamping devices are claming and releasing a cable and advancing it, a series of presser rolls associated with the plunger for forcing the wires of the cable into the spacers, and means for adjusting the position of the presser rolls to determine the distance the wires are forced into the spacers.

18. In a cable-forming apparatus, a magazine for supporting a plurality of spacing insulators, oscillatable means for removing insulators from said magazine one at a time and for carrying them to a position adjacent an assembly station, and means for reciprocating a portion of said oscillatable means to move an insulator into wedging engagement with a plurality of wires.

GEORGE A. SEELEY.